(12) United States Patent
Halme

(10) Patent No.: US 7,099,284 B2
(45) Date of Patent: Aug. 29, 2006

(54) DATA TRANSMISSION CONTROL AND PERFORMANCE MONITORING METHOD OF AN IPSEC LINK IN A VIRTUAL PRIVATE NETWORK

(75) Inventor: Matti Halme, Turku (FI)

(73) Assignee: Stonesoft Oy, Helsinki (FI)

( * ) Notice: Subject to any disclaimer, the term of this patent is extended or adjusted under 35 U.S.C. 154(b) by 862 days.

(21) Appl. No.: 09/727,147

(22) Filed: Nov. 29, 2000

(65) Prior Publication Data

US 2002/0027884 A1   Mar. 7, 2002

(30) Foreign Application Priority Data

Jul. 24, 2000   (FI) .................................. 20001702

(51) Int. Cl.
*H04L 12/26* (2006.01)
*G06F 15/173* (2006.01)

(52) U.S. Cl. ..................................... 370/253; 709/224

(58) Field of Classification Search ........ 370/216–220, 370/229, 230–235, 237, 252, 253, 328, 338, 370/400, 401; 709/220–227
See application file for complete search history.

(56) References Cited

U.S. PATENT DOCUMENTS

| | | | |
|---|---|---|---|
| 4,617,657 A | 10/1986 | Drynan et al. ................. 370/60 |
| 6,446,200 B1 * | 9/2002 | Ball et al. ....................... 713/1 |
| 6,526,022 B1 * | 2/2003 | Chiu et al. ................... 370/229 |
| 6,622,172 B1 * | 9/2003 | Tam ............................ 709/232 |
| 6,674,713 B1 * | 1/2004 | Berg et al. ................... 370/217 |
| 6,680,922 B1 * | 1/2004 | Jorgensen ................... 370/328 |
| 6,775,553 B1 * | 8/2004 | Lioy ............................ 455/461 |
| 6,785,823 B1 * | 8/2004 | Abrol et al. ..................... 726/7 |
| 2001/0012355 A1 * | 8/2001 | Dunn et al. ................. 379/230 |
| 2002/0119821 A1 * | 8/2002 | Sen et al. ...................... 463/42 |
| 2004/0042607 A1 * | 3/2004 | Gallant et al. ......... 379/220.01 |
| 2005/0027859 A1 * | 2/2005 | Alvisi et al. ................. 709/224 |

FOREIGN PATENT DOCUMENTS

EP    1 052 797 A2    11/2000

OTHER PUBLICATIONS

Tuquerres et al, "Mobile IP: Security and Application", Dec. 1999, pp. 1-8.*
"Quantifying TCP Performance Improvements in Noisy Environments Using Protocol Boosters" by Bakin, D.S. Proceedings ISCC 2000. Fifth IEEE Symposium on Computers and Communications, Proceedings of 5th IEE Symposium on Computer and Communications (ISCC 2000) Antibes-Juan Les Pins, France, Jul. 3-6, 2000.

* cited by examiner

*Primary Examiner*—Seema S. Rao
*Assistant Examiner*—Gregory B. Sefcheck
(74) *Attorney, Agent, or Firm*—Ronald Craig Fish A Law Corporation

(57) ABSTRACT

The invention relates to methods for controlling of transmission of data in IP networks. According to the invention, the sequence numbers and sending times of transmitted IPSec packets are stored, acknowledgement is sent for every N:th received IPSec packet or after any IPSec packet if T seconds have elapsed after sending a previous acknowledgement packet, the acknowledgement comprising the sequence number of the particular IPSec packet after the reception of which the acknowledgement is sent and the counter values indicating the number of packets and bytes received, and at least the round trip time, packet success rate and throughput value are determined from the reception time of the acknowledgement and the stored sending time associated with the sequence number in the acknowledgement and the counter values indicating the number of packets and bytes received.

22 Claims, 6 Drawing Sheets

DATA TRANSMISSION CONTROL AND PERFORMANCE MONITORING METHOD OF AN IPSEC LINK IN A VIRTUAL PRIVATE NETWORK

BACKGROUND OF THE INVENTION

1. Field of the Invention

The invention relates to methods for controlling of transmission of data in IP networks. Especially, the invention is related to such a method as specified in the preamble of the independent method claim.

2. Description of Related Art

The public Internet is presently being used more and more for sensitive and mission critical communications. Since the basic mechanisms of the internet were originally not designed with secrecy and confidentiality in mind, the internet is an untrusted network. Skilled individuals can in many cases eavesdrop or divert communications, which requires the use of different kinds of security measures in order to use the internet for sensitive communications.

One widely used structure is the virtual private network (VPN). A virtual private network is established on top of an untrusted network such as the Internet by constructing encrypted data transmission channels. A virtual private network is typically used to connect distant offices of an organization to each other over the public Internet. All traffic from the local area network of a first office directed to a second office is encrypted by a network element at the first office, sent in encrypted form over the internet to the second office, where a network element decrypts the transmitted data and forwards the decrypted data to the local area network of the second office. The VPN is typically transparent to the processes that are communicating between each other.

Virtual private networks are typically constructed using the IPSec protocol suite. The IPSec protocol suite is described in the standard RFC 2401 "Security Architecture for the Internet Protocol". IPSec offers access control, connectionless integrity, data origin authentication, protection against replays, confidentiality (encryption), and limited traffic flow confidentiality. The IPSec protocol suite provides an infrastructure for the data transmission and encryption processes, but does not define any specific encryption method. Many different kinds of encryption methods can be used for IPSec connections. Virtual private networks typically use so called tunnel mode, in which an entire data packet is encrypted, and the result is transmitted as a payload in another data packet. IPSec traffic is unidirectional. IPSec does not provide flow control or error recovery, but leaves these to the protocols carried within the secured channel created by IPSec. IPSec does not thus give any help for measuring the quality of connection such as the throughput of the connection or delays of the connection or even detecting that a connection has turned inoperative. This is a problem especially when a plurality of transmission paths is used for transferring data between two parties.

SUMMARY OF THE INVENTION

An object of the invention is to realize a measurement method enabling the monitoring of the performance of an IPSec link. A further object of the invention is to realize a measurement method, which allows monitoring of a plurality of links.

The objects are reached by sending acknowledgement packets after every N:th received IPSec packet or after receiving any packet when a pretermined time has occurred after sending a previous acknowledgement packet, the acknowledgement comprising at least sequence number of received IPSec packet and preferably also a counter value indicating the number of packets received from that link and/or the number of bytes received from that link, allowing the determination of the packet success and/or the throughput of the link. Further information such as round trip time of the link can be obtained by storing sending times and sequence numbers of sent IPSec packets and comparing them with receiving times of acknowledgement packets containing the same sequence number. Further information such as round trip time of a link not currently used to pass any traffic can be obtained by sending special probe packets, storing the sending times of such packets and substracting that time from the time of receiving a responce to such packet. Additionally the transmission of a plurality of such probe packets can be used to determine the packet success rate of a link not currently used to pass any traffic.

The method for monitoring of a communication link between a source network node and a destination network node according to the invention is characterized by that, which is specified in the characterizing part of the independent method claim directed to a method for monitoring of a communication link between a source network node and a destination network node. The method for monitoring of a plurality of communication links between a source network site and a destination network site is characterized by that, which is specified in the characterizing part of the independent method claim directed to a method for monitoring of a plurality of communication links between a source network site and a destination network site. The network nodes according to the invention is characterized by that, which is specified in the characterizing parts of the independent claims directed to a network node. The computer software product according to the invention is characterized by that, which is specified in the characterizing part of the independent claim directed to a computer software product. The dependent claims describe further advantageous embodiments of the invention.

BRIEF DESCRIPTION OF THE DRAWINGS

Various embodiments of the invention will be described in detail below, by way of example only, with reference to the accompanying drawings, of which

Same reference numerals are used for similar entities in the figures.

DETAILED DESCRIPTION OF THE PREFERRED EMBODIMENTS

A. A General Description of the Invention

In the following, a structure called as a "clustered multi-ISP VPN" is described generally for clarifying the whole system in which the invention is applied.

Figure 1:
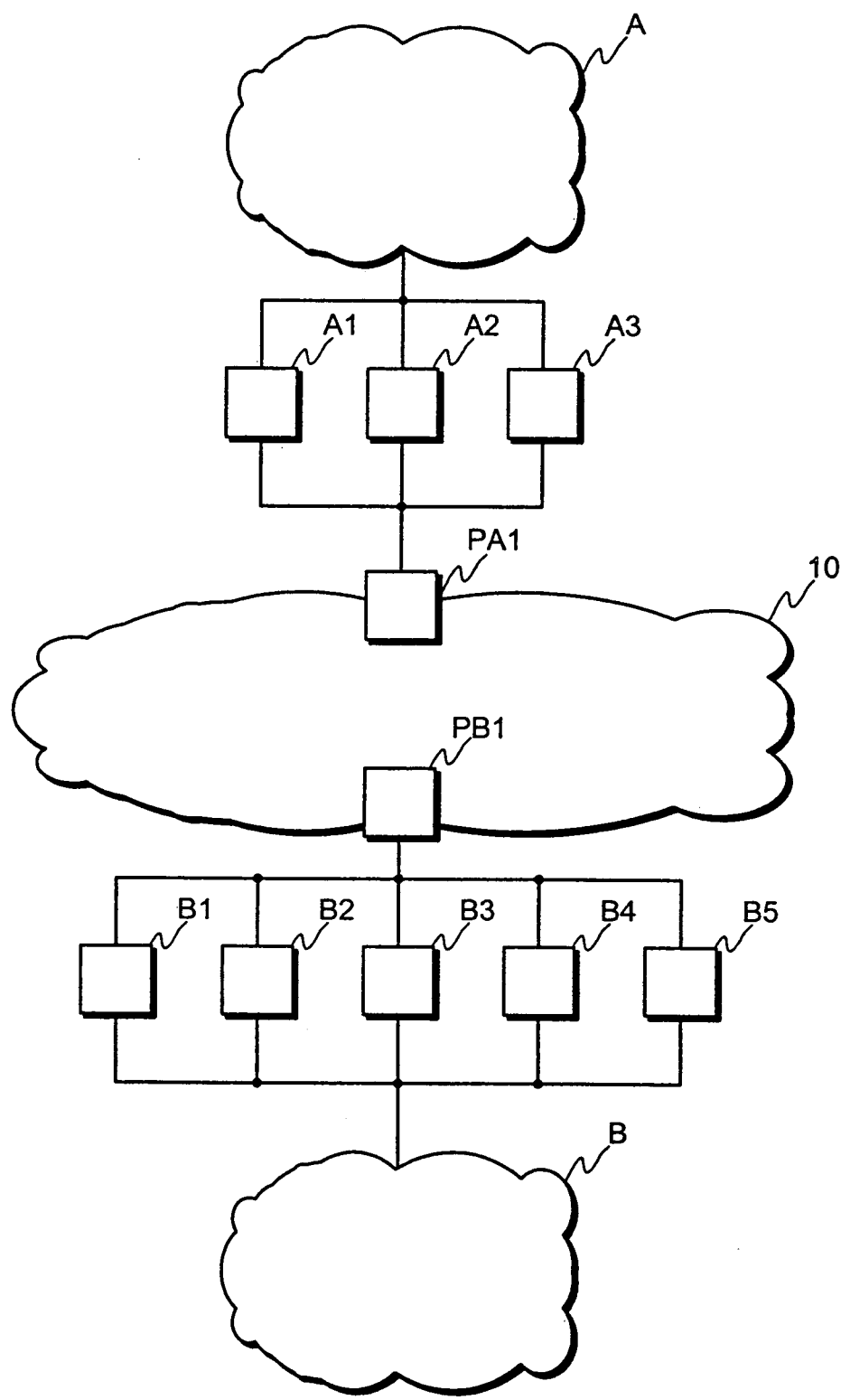
FIG. 1 illustrates a network structure using a clustered VPN gateway structure.

Clustered VPN means that instead of single VPN gateway in a site, more than one gateways is used. The clustered structure increases availability and distributes encryption and decryption load, therefore reducing the probability of a downtime to nearly zero and increasing the throughput of the VPN. The number of nodes i.e. gateways may be different at different endpoints of the VPN. Clustering may also be applied to one endpoint of a VPN only. FIG. 1 illustrates a configuration where there are 3 nodes in site A and 5 nodes in site B. Nodes A1, A2, and A3 connect the internal network A of site A to the internet 10, and nodes B1, B2, B3, 4, and B5 connect the internal network B of site B to the internet 10. In the structure of FIG. 1, each site is connected to the internet via only one ISP PA1, PB1.

Figure 2:
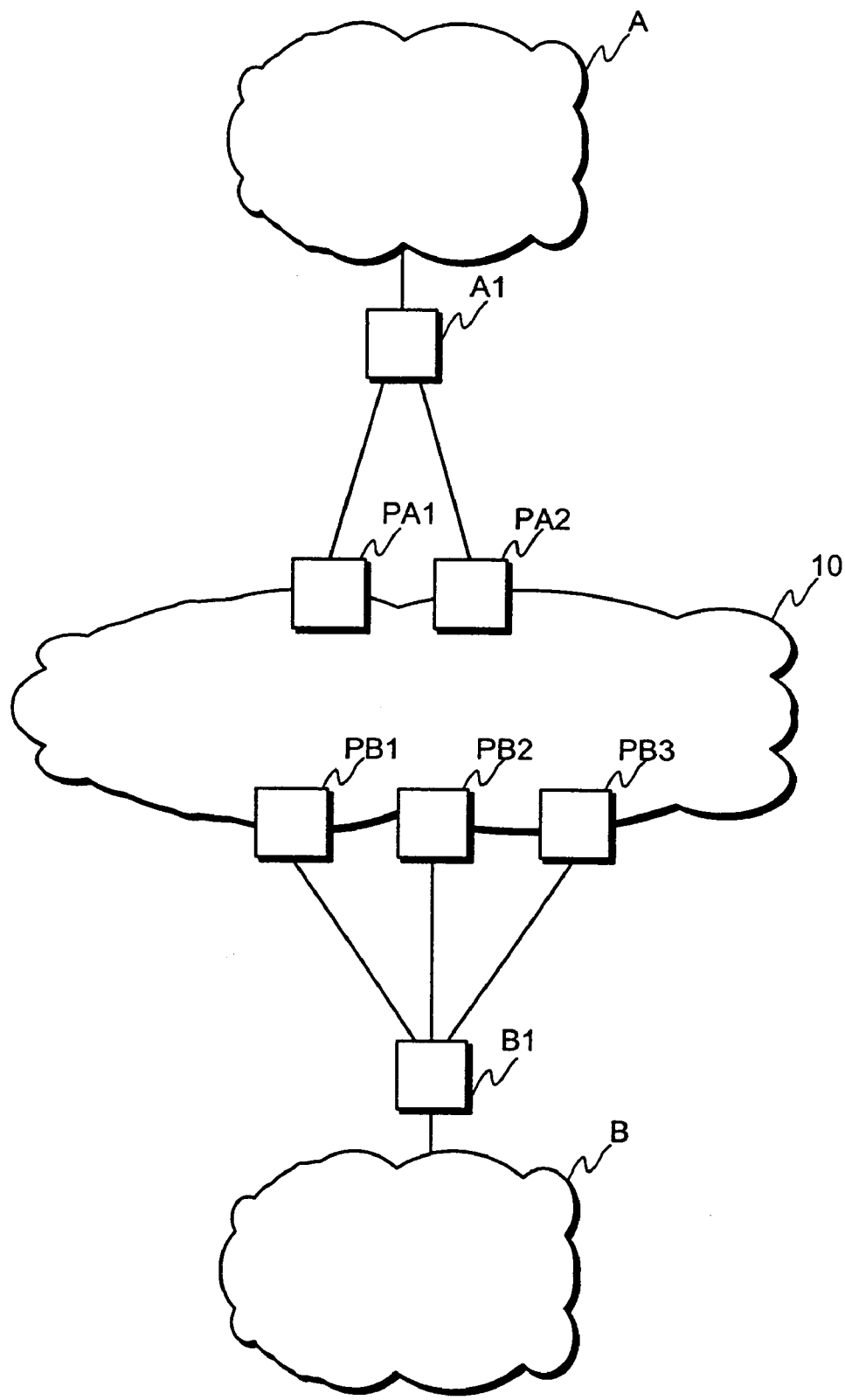
FIG. 2 illustrates a network structure using a multi-ISP structure.

The term "multi-ISP VPN" refers to such a configuration, in which a site is connected to the internet using more than one connection offered by internet service providers (ISP). Preferably each connection is via a different ISP in order to provide redundancy to avoid large problems, if the service of one of the internet service providers malfunctions. FIG. 2 illustrates such a configuration. FIG. 2 shows the internal network A of site A, internet 10, and internal network B of site B. The VPN gateway node A1 of site A is connected to two different internet service providers PA1 and PA2. The VPN gateway node B1 of site B is connected to three different internet service providers PB1, PB2, and PB3. Such a configuration increases the availability of the connection, since should one of the ISP connections malfunction, the traffic can be directed to flow via another ISP.

Figure 3:
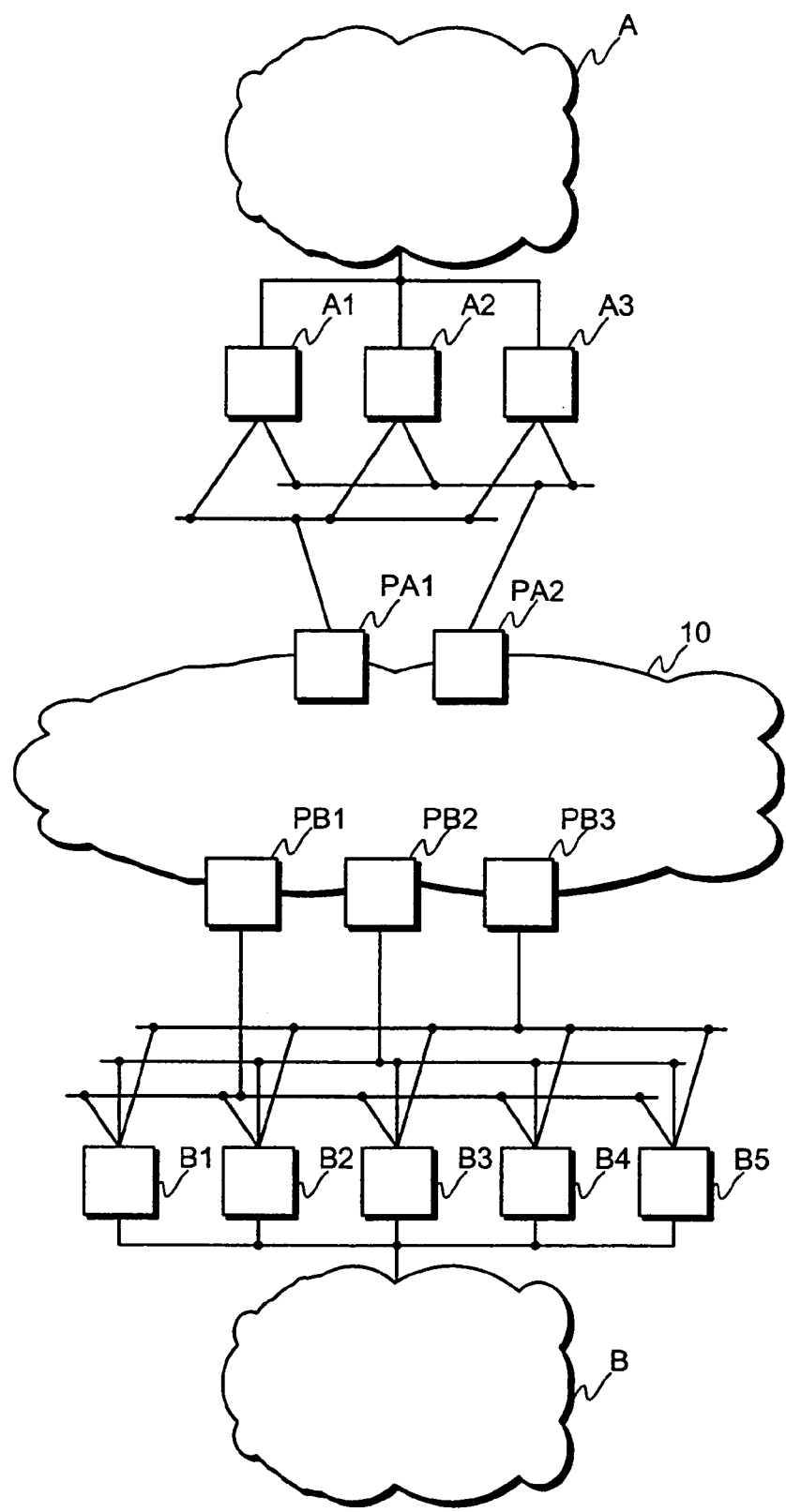
FIG. 3 illustrates a network structure having both a clustered VPN gateway structure and a multi-ISP structure.

FIG. 3 illustrates a structure, where both clustering and connections via multiple internet service providers are used. FIG. 3 shows the internal network A of site A, internet 10, and internal network B of site B. Site A has three VPN nodes A1, A2, and A3, each of which is connected to both internet service providers PA1, PA2. Site B has five VPN nodes B1, B2, B3, B4, and B5, each of which is connected to three ISP connections PB1, PB2, and PB3. Such a structure provides a system having high availability i.e. an extremely low probability of outage of service. Such a structure can manage breakdowns in a VPN node, breaks in connections between a site and an ISP, and breaks in the internet connections of ISPs. Such a structure also provides an increased amount of processing power needed for encryption and decryption. Another factor which increases the capacity of the structure is that a plurality of connections exist in the internet between the various ISPs, and the structure is able to select the best performing route through Internet among those offered by the ISPs.

In such a structure as shown in FIG. 3, a data packet traversing from a host in a first internal network A to a host in a second internal network B can use many different routes. The packet can be handled by any of the VPN nodes at both ends, and transmitted via any of the ISPs at both ends. Consequently, there are four route selection decisions to be made when transmitting the packet from a host in network A to a host in network B. These decisions and the way in which they are made are critical regarding the performance of the total system. The route selection decisions are the following:

1. Selection of outbound processing VPN node.
2. Selection of ISP where the packet is sent to from the originating site.
3. Selection of the ISP where the packet is received from in the destination site.
4. Selection of inbound processing VPN node.

For optimum performance, the selections should be stable i.e. stay the same for a relatively long time for packets in a given logical connection between the particular hosts in the internal networks A and B, unless availability and/or performance reasons dictate a change in the selections. Stability requirements arise from the need to try to preserve the order of the packets going through Internet.

This patent application is concerned monitoring associated with decisions 2 and 3 above, whereby the decisions 1 and 4 are not described here any further.

In a further advantageous embodiment of the invention, the selection of the ISP via which the packet is sent from the originating site is performed in the originating VPN node. Examples of ways of performing the selection are described later in this patent application.

In a further advantageous embodiment of the invention, the selection of the ISP via which the packet is routed from the internet to the destination site is performed in the originating VPN node. Examples of ways of performing the selection are described later in this patent application.

B. Embodiments According to a First Aspect of the Invention

According to a first aspect of the invention, a method for measuring the performance of a communication link employing the IPSec protocol is provided. In the method, the monitoring is effected by arranging the destination network node to send an acknowledgement packet for every N:th IPSec packet received from the originating network node. The acknowledgement packet comprises at least a sequence number of the IPSec packet, after which the acknowledgement packet is sent. The sequence number of an IPSec packet is present in the ESP (enhanced security payload) or in the AH (authentication header) header, as described in the corresponding RFC documents and well known by a man skilled in the art.

In a further advantageous embodiment of the invention, sending of an acknowledgement packet is caused also by reaching a certain time limit. In such an embodiment, if more time than a predefined limit T has elapsed after the previous acknowledgement packet has been sent, an acknowledgement packet is sent immediately when an IPSec packet is received even if less than N packets have been received. That is, the fulfillment of either criterion—reception of more than N packets or elapsing of time T after sending of the previous acknowledgement packet —causes the sending of an acknowledgement packet. Such an embodiment provides a more optimum functionality in such cases, when the amount of traffic is low and variable. The time T depends on the requirements of the particular application of the invention, whereby no fixed values for T can be given. Considering the typical capacities of packet networks and typical requirements for data transmission for VPN connections at the time of writing this patent application, the time T can advantageously be between 0.1 and 100 seconds, even more advantageously between 1 and 10 seconds.

In a further advantageous embodiment of the invention, the number of received packets and/or the number of received bytes are counted at the destination node, and the current value of one or both of these counters is included in the acknowledgement packets when they are generated and sent. This allows the destination node to adjust the acknowledgement frequency (i.e. the number N) without negotiation with the originating node or explicit indication of the change of N to the originating node, since the originating node can then observe how many packets have gone through when receiving an acknowledgement packet. The inclusion of one or both of these counter values in the acknowledgement packets has also the advantage, that the measurement error caused by loss of an acknowledgement packet is remedied more rapidly than without these counter values.

The source network node receives the acknowledgement packets, and notes the sequence number mentioned in the acknowledgement packet, and the packet counter value in such an embodiment, in which packet counter values are included in the acknowledgement packets.

In an advantageous embodiment of the invention, the source network node stores sending times, SPI field contents and sequence numbers of sent IPSec packets for a period of time in order to be able to measure the round trip time (RTT) of the connection. The number of timestamps needed to store depend on N, IPSec packet sending frequency, and RTT. The source network node can then calculate the round trip time by comparing the sequence number of a received acknowledgement packet and its reception time to the stored sending time of the corresponding original IPSec packet. The source network node can also calculate the packet success rate for the connection by calculating the ratio of sent IPSec packets and received acknowledgements. The source network node can advantageously calculate a moving average of the success rate to filter out the effects of temporary changes in round trip time.

In such an embodiment, in which packet counter values are included in the acknowledgement packets, the source network node can calculate the packet success rate for the connection by calculating the ratio of sent IPSec packets and the differences of the packet counter values of received acknowledgements. Further, in such an embodiment in which byte counter values are included in the acknowledgement packets, the source network node can calculate the realized throughput based on the byte counter values and associated timestamps of a received acknowledgement and the previous received acknowledgements. The source network node can advantageously calculate a moving average of the success rate and throughput to filter out the effects of temporary changes in round trip time.

The number N is advantageously between 50 and 500. However, the optimum value of N depends on the quality of the communication link and the statistical properties of changes in the quality of the communication link. If the properties of the link such as the throughput and the delay of the link do not vary much within relatively short monitoring periods, it is not necessary to follow the properties very accurately, whereby the number N can be adjusted to a high value such as 1000 or even higher. Conversely, if the properties of the communication link vary considerably even within short monitoring periods, it may be advantageous to follow the variations more accurately, in which case the number N can be adjusted to a low value, such as 50, 20, or even 10. However, lowering the value of number N increases the load caused by the performance monitoring on the network. Therefore, the optimum value for the number N depends on the requirements of the particular application of the invention and properties of the particular communication link or links used.

The time interval T is advantageously between 1 second and 10 seconds. However, the optimum value of T depends on the quality of the communication link and other factors similar to those affecting the optimum value of T. Therefore, the optimum value for the interval T depends on the requirements of the particular application of the invention and properties of the particular communication link or links used.

This measurement method is able to measure the round trip time, packet success rate and throughput. The method is also able to continuously monitor these parameters as long as there is traffic to be sent over the connection. The measurement method has also the advantage, that the overhead load inflicted by the measurement method is very light.

In an advantageous embodiment of the invention, inactive routes are monitored using probing in addition to the monitoring of active routes as described above. In such an embodiment, a VPN node sends one or more probe packets via each possible connection to a VPN node at the other site, which sends a response packet as a response to receiving a probe packet. Upon receiving a response packet, the originating VPN node can measure round trip time for that route. If the originating VPN node sends a plurality of probe packets via each possible route, the originating VPN node can also monitor packet success rate, i.e. what percentage of packets go succesfully through the network. Such probing can be used on all possible combinations of ISP connections and VPN nodes.

C. Embodiments According to a Second Aspect of the Invention

When a tunneling IPSec packet is constructed in the originating firewall node, its source IP address is set to the originating cluster's IP address and its destination IP address to the IP address of the destination cluster. These IP addresses are called the tunnel endpoints. In such configuration where a cluster is connected to the Internet using multiple ISP connections, a cluster has several IP addresses, i.e. one for each ISP connection. Such ISP connections can be connections provided by different ISPs. In such a configuration the selection of these IP addresses determines the ISP connections to be used. Selection of a source IP address and a destination IP address for a data packet therefore selects the ISP connection at the source site and the ISP connection for transmission of the data packet. Since the sender of a data packet specifies both of these IP addresses, the ISP connections for the packet are specified by the sender. The present aspect of the invention specifies an advantageous way of selecting the ISP connections at the source and the destination site.

A selection method should select such a combination of source and destination ISP connections that is currently functional if one such combination exists, select such a combination of source and destination ISP connections that currently has the best throughput, and minimize the changes in the combination of source and destination ISP connections in order to minimize the overhead spent in setting up IPSec connections.

In an advantageous embodiment of the invention, the source and destination ISP connections are selected at least in part on the basis of at least the following three parameters:
  last measured round trip time (RTT) for each combination of source and destination ISP connections,
  last measured packet success rate for each combination of source and destination ISP connections and
  last measured throughput for each combination of source and destination ISP connections.

In a further advantageous embodiment of the invention, the source and destination ISP connections are selected at least in part on the basis of at least the following four parameters:

last measured round trip time (RTT) for each combination of source and destination ISP connections, last measured throughput for each combination of source and destination ISP connections, last measured packet success rate for each combination of source and destination ISP connections and time elapsed after the output of the selection method changed In an advantageous embodiment of the invention, the following function is used in selection of the source and destination ISP connections:

$$P = A*R^{-1} + B*S + C*S^N*T \quad (1)$$

in which R is the measured round trip time (RTT), S the packet success rate (PSR) having the value range of from 0 to 1, and T the throughput (THR). A, B, C, and N are constants, which are adjusted according to the requirements of the particular application of the embodiment. Suitable values can be found for example by experimentation. Since characteristics of practical implementations vary widely, any more details about values for these constants suitable for general use cannot be given here. The value P calculated for each route is used to rank the available routes in a preference order for selection of a route, i.e. particular source and destination ISP connections. According to equation (1), the shorter the round trip time or the higher the packet success rate is, the higher is the preference P of a particular route. The third term of equation (1) gives weight to the throughput only in those cases, when the packet success rate is close to 1.

Since measurement results for these three values RTT, PSR, and THR might not always be available, certain default values are needed. For example, if a particular route is not active, no throughput rate can be determined for that route. In an advantageous embodiment of the invention, the default value for packet success rate and throughput is zero.

In an advantageous embodiment of the invention, the default value for the round trip time is calculated using a certain function, if the packet success rate is higher than zero. This is based on the practical experience of the applicant, that in practice the round trip time and the packet success rate correlate at least roughly. When the packet success rate is 1 or near to 1, the round trip time is at a minimum, and when the packet success rate is near zero, the round trip time is very long. Accordingly, in an advantageous embodiment of the invention, if the round trip time cannot be measured directly, a default value for the round trip time is determined from packet success rate using the function $$R = D/S^K \quad (2)$$

where R is the round trip time, S is the packet success rate, D is a constant representing the minimum of the round trip time, and K is a constant. The value of D depends on the properties of the network between the source and destination nodes and can be determined experimentally. A suitable value for K can be determined for example by correlation experiments. In such a case in which packet success rate is zero, a large time constant such as 10 seconds is used for the value of the round trip time.

Other parameters affecting the selection of the source and destination ISP connections are the weighing factors of the previously mentioned parameters, i.e. what is the relative importance of the parameters. These weighing factors depend on the particular circumstances and requirements of each application of the invention, and can be determined for example experimentally.

In an advantageous embodiment of the invention the properties of different combinations of source and destination ISP connections are determined by sending probe packets via each combination, to which the destination site replies. The round trip time for each combination can then be found out from the time elapsed between sending of the probe packets and the received replies. For example, if the source site has two ISP connections and the destination site has three ISP connections, six probe packets are enough to test all six combinations.

In an advantageous embodiment of the invention, probe packets are sent only via inactive combinations, and the round trip time of an active connection is measured from acknowledgement packets sent by the destination site as described previously in this patent application.

Further, is one of the combinations is active, the throughput can be measured by measuring the traffic flowing through the connection. However, such a measurement does not always reflect the true throughput, since the true capacity of the connection combination can be well above the current amount of traffic. In an advantageous embodiment of the invention, a peak throughput value observed in a time window of specified length is used as the measurement value for throughput.

In the case of inactive connection combinations, no current throughput values can be measured. Therefore, in an advantageous embodiment of the invention, previously measured throughput values are used. In a further advantageous embodiment of the invention, previously measured values are not used after a certain time has passed after the measurement in order to avoid the use of obsolete and incorrect values. In such a case, a default throughput value can be used for estimating the performance of the link.

In another advantageous embodiment of the invention, a throughput value for use in performance estimation of a link is calculated according to a predefined function on the basis of round trip time of that link. This approach may give advantageous results, since it has been observed, that short round trip times are generally correlated with high throughput values.

In an advantageous embodiment of the invention, the properties of the combinations are monitored semicontinuously by sending probe packets at certain time intervals. If the time intervals are relatively long, say a plurality of seconds such as 30 seconds, the transmission of probe packets do not create any significant load on the transmission network.

Figure 4:
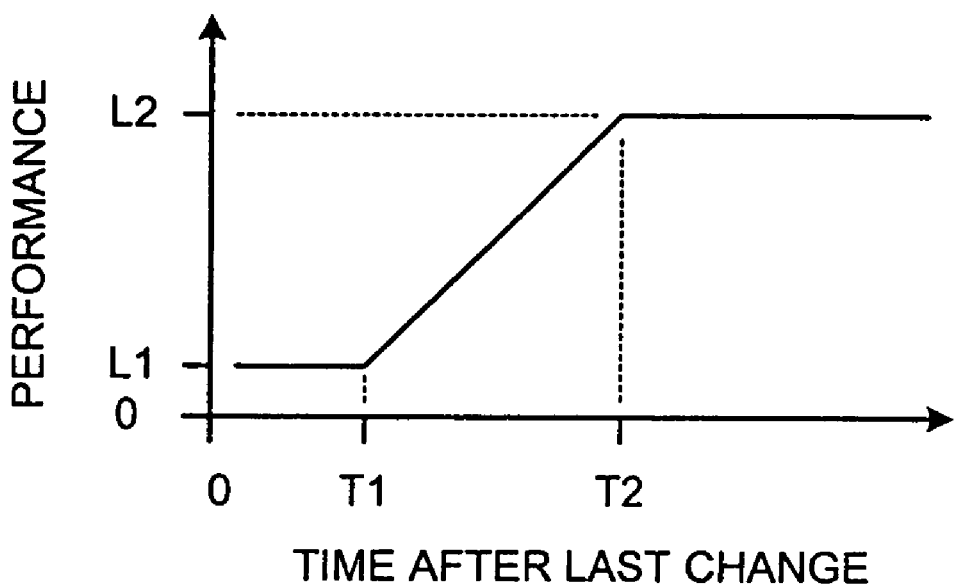
FIG. 4 illustrates the effect of time to a route selection parameter according to an advantageous embodiment of the invention.

Time elapsed after last change ISP connection in either end is in an advantageous embodiment of the invention used to minimize the changes, which require setting up of new IPSec connections. Shortly after a change in the ISP connections, a new change is made only if the current connection is nearly or completely broken. Later on, the readiness for making a change increases and eventually reaches a point when a relatively small assumed increase in performace would trigger a change. This is illustrated in FIG. 4, which shows a graph depicting how low the level of performance of the current link needs to drop before inducing a change in the ISP connections used. The vertical axis shows the minimum required performance level, and the horizontal axis shows the time elapsed after last change in configuration. As FIG. 4 illustrates, immediately after a change in configuration until a moment T1 the required performance is very low, i.e. at limit L1. During that time the ISP connection configuration is changed only if the performance of the communication link drops below treshold L1.

Between time instants T1 and T2, the required limit increases to value L2, and after time T2, the limit stays at L2. This has the effect, that the farther back in time the previous change was made, the smaller drop in the performance of the communication link is required to cause a change in the configuration. The parameters L1, L2, T1, and T2 depend on the properties and requirements of the particular application of the invention, wherefore no specific values can be given here.

In an advantageous embodiment of the invention, the units of the vertical axis and the parameters L1 and L2 specify certain absolute performance values. In such an embodiment, the limits can be set to be between 0% and 100% of the best observed performance for the current link.

In a further advantageous embodiment of the invention, the limits L1 and L2 specify certain relative performance values, i.e. values of the ratio of the current performance of the current link to the best observed performance of all of the available links i.e. ISP connection combinations.

The performance values used as a basis for deciding according to the graph in FIG. 4 can be calculated in many different ways from the observed round trip times, packet success rate and throughput measurements. In an exemplary embodiment of the invention, a performance value P can be calculated as $$P = A*R^{-1} + B*S + C*S^N*T \quad (3)$$

in which A, B, C and N are is a constants, S is a packet success rate, T is a throughput value, and R is a round trip time measurement value. According to equation (3), an increase of the packet success rate, increase of the throughput or a decrease of the round trip time increase the observed performance. However, equation (3) is only an example of a feasible calculation method, and many different calculation methods can be used in various embodiments of the invention. Therefore, the invention is not limited to the use of only equation (3). A more general example of a feasible function for calculating P is $$P = A*R^{-n} + B*S + C*S^N*T^m \quad (4)$$

where n and m are constants to be adjusted to suit the requirements of the particular application of the invention.

Figure 5:
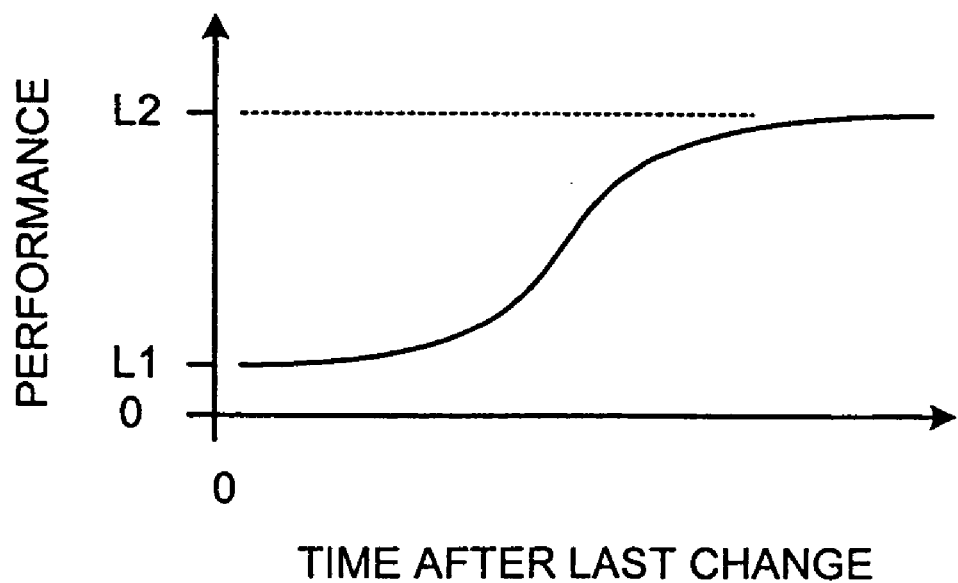
FIG. 5 illustrates the effect of time to a route selection parameter according to a further advantageous embodiment of the invention.

FIG. 4 shows a simple piecewise linear function as the time-dependent treshold function. Such a simple function is advantageous due to the ease of implementation of such a function. However, the invention is not limited to only such a function. FIG. 5 shows another example of a suitable function, in which the limit changes smoothly from L1 to L2 over a period of time. The optimum function for use depends on the requirements of the particular application of the invention, wherefore the invention is not limited to any specific function to be used.

In another advantageous embodiment of the invention, multiple links are kept active and traffic is divided between the links in proportions that correspond to the performance value P calculated for each link in a way similar to those performance values presented in equations (3) and (4).

D. A FIRST GROUP OF FURTHER ADVANTAGEOUS EMBODIMENTS OF THE INVENTION

Figure 6:
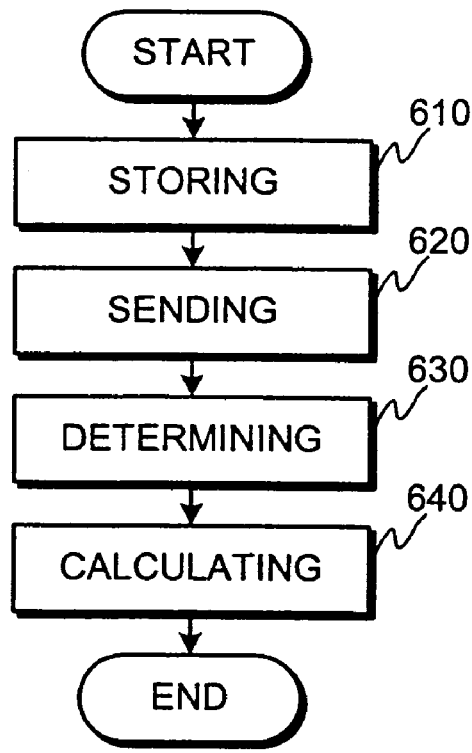
FIG. 6 illustrates a method according to an advantageous embodiment of the invention.

According to a further aspect of the invention, a method for monitoring of a communication link employing the IPSec protocol between a source network node and a destination network node is provided. Various embodiments according to the present aspect of the invention are illustrated in FIG. 6. According to an advantageous embodiment of the invention, the method comprises at least the steps of storing 610 of the sequence number and the transmission time of each IPSec packet transmitted from the source network node to the destination network node in a memory means, sending 620 of an acknowledgement packet as a response to reception of every N:th IPSec packet or to reception of any IPSec packet when T seconds has elapsed after sending a previous acknowledgement packet from the source network node by the destination network node, said acknowledgement packet comprising the sequence number of the particular packet as a response to which the acknowledgement packet is sent and the counter indicating the number of packets and number of bytes received, N being a predefined positive integer and T being a predefined time value, determining 630 the round trip time of the connection on the basis of the reception time of an acknowledgement packet and the stored transmission time of the corresponding transmitted packet.

According to a further advantageous embodiment of the invention, the method further comprises the step of calculating 640 of packet success rate and throughput value of the connection on the basis of number of transmitted packets and the number of received packets and bytes determined from the counter values sent in the acknowledgement packets.

Figure 7:
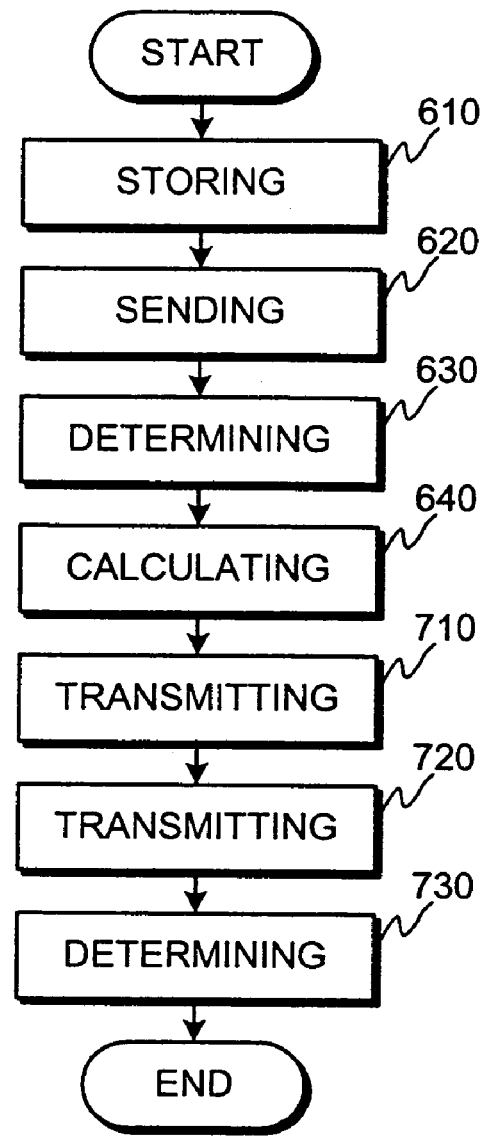
FIG. 7 illustrates a method according to an advantageous embodiment of the invention.

According to a yet further aspect of the invention, a method for controlling of communication between a source network site and a destination network site, in which communication IPSec protocol is used, in which communication a plurality of different routes between the source network site and the destination network site can be used is provided. Various embodiments according to the present aspect of the invention are illustrated in FIG. 7. According to an advantageous embodiment of the invention, the method comprises at least the steps of storing 610 of the sequence number and the transmission time of each IPSec packet transmitted from a source node in the source network site to a destination node in the destination network site in a memory means, sending 620 of an acknowledgement packet as a response to reception of every N:th IPSec packet or to reception of any IPSec packet when T seconds have elapsed after sending a previous acknowledgement packet from said source node by said destination node, said acknowledgement packet comprising the sequence number of the particular packet as a response to which the acknowledgement packet is sent and the counter indicating the number of packets and number of bytes received, N being a predefined positive integer and T being a predefined time value, determining 630 the round trip time of the connection on the basis of the reception time of an acknowledgement packet and the stored transmission time of the corresponding transmitted packet.

According to a further advantageous embodiment of the invention, the method further comprises the step of calculation 640 of packet success rate and throughput value of the connection on the basis of number of transmitted packets and the number of received packets and bytes determined from the counter values sent in the acknowledgement packets.

According to a further advantageous embodiment of the invention, the method further comprises the steps of transmitting 710 a probe packet or a plurality of probe packets from a source node at the source network site via a specific route to a destination node at the destination network site, storing the transmission time of said probe packet in a memory means, transmitting 720 a response packet from said destination node to said source node as a response to receiving each probe packet, determining 730 the round trip time of said specific route from the difference of the reception time of the response packet and the stored transmission time of the corresponding probe packet and the packet success rate based on the number of sent probe packets and the number of received responce packets.

According to a further aspect of the invention, a network node for receiving communication employing the IPSec protocol is provided. According to an advantageous embodiment of the invention the node comprises at least means for receiving IPSec packets, means for extracting a sequence number from a received IPSec packet, and means for sending an acknowledgement packet as a response after every N:th received IPSec packets or after any IPSec packet if T seconds have elapsed after sending a previous acknowledgement packet, where N is a positive integer and T is a predefined value, and for including said extracted sequence number and a counter values indicating the number of received packets and bytes in said acknowledgement packet.

According to a further aspect of the invention, a network node for sending communication employing the IPSec protocol is provided. According to an advantageous embodiment of the invention the node comprises at least means for sending IPSec packets, means for storing timestamps and sequence numbers of sent IPSec packets, means for receiving acknowledgement packets, means for determining the round-trip time of a connection on the basis of sequence number information in a received acknowledgement packet and stored timestap and sequence number information of sent IPSec packets, means for calculating the packet success rate on the basis of number of sent packets and the information in a received acknowledgement packet indicating the number of received packets, and means for calculating the throughput value on the basis of the information in a received acknowledgement packet indicating the number of received bytes.

E. A Second Group of Further Advantageous Embodiments of the Invention

According to a further aspect of the invention, a method for monitoring of a communication link between a source network node and a destination network node, which communication link employs the IPSec protocol, is provided. According to the embodiment, the method comprises at least the step of transmission of an acknowledgement packet by the destination network node if at least one of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet.

In this patent application and in the accompanying patent claims, the term active connection refers to a connection being used for transmission of payload data, while the term inactive connection refers to a connection not being used for transmission of payload data. Mere transmission of probe packets in order to measure characteristics of a connection is not intended here to be transmission of payload data.

According to a further advantageous embodiment of the invention, in the method, the acknowledgement packet comprises at least the sequence number of the last received IPSec packet and at least one value corresponding to the amount of data received via the communication link.

According to a further advantageous embodiment of the invention, in the method, said acknowledgement packet comprises at least a packet counter value indicating the number of packets received via the communication link.

According to a further advantageous embodiment of the invention, in the method, said acknowledgement packet comprises at least a byte counter value indicating the number of bytes received via the communication link.

According to a further advantageous embodiment of the invention, in the method, said acknowledgement packet comprises at least a packet counter value indicating the number of packets received via the communication link and a byte counter value indicating the number of bytes received via the communication link.

According to a further advantageous embodiment of the invention, the method further comprises at least the step of determining the packet success rate of the communication link at least partly on the basis of information contained in an acknowledgement packet.

According to a further advantageous embodiment of the invention, the method further comprises at least the step of determining the throughput of the communication link at least partly on the basis of information contained in an acknowledgement packet.

According to a further advantageous embodiment of the invention, the method further comprises at least the steps of storing of the sequence number and the transmission time of each IPSec packet transmitted from the source network node to the destination network node in a memory means, and determining the round trip time of the communication link on the basis of the reception time of an acknowledgement packet and the stored transmission time of the corresponding transmitted packet.

F. A Third Group of Further Advantageous Embodiments of the Invention

According to a further aspect of the invention a method for monitoring of a plurality of communication links between a source network site and a destination network site, each of the sites having at least one network node, is provided. In the method an active communication link is monitored and an inactive communication link is monitored, in which method steps for monitoring an active communication link between the source network site and the destination network site, the active communication link employing the IPSec protocol, comprise at least the step of transmission of an acknowledgement packet by the destination network node if at least one of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet, and in which method steps for monitoring an inactive communication link between the source network site and the destination network site comprise at least the steps of transmitting a probe packet from a source node at the source network site via said inactive communication link to a destination node at the destination network site, storing the transmission time of said probe packet in a memory means, transmitting a response packet from said destination node to said source node as a response to receiving a probe packet, determining the round trip time of said inactive communication link from the difference of the reception time of the response packet and the stored transmission time of the corresponding probe packet.

According to a further advantageous embodiment of the invention, the method further comprises the steps of transmitting a plurality of probe packets from said source node at the source network site via said inactive communication link to said destination node at the destination network site, receiving response packets to said probe packets, and determining the packet success rate of said inactive communication link from the number of said received response packets and the number of transmitted probe packets.

G. A Fourth Group of Further Advantageous Embodiments of the Invention

Figure 8:
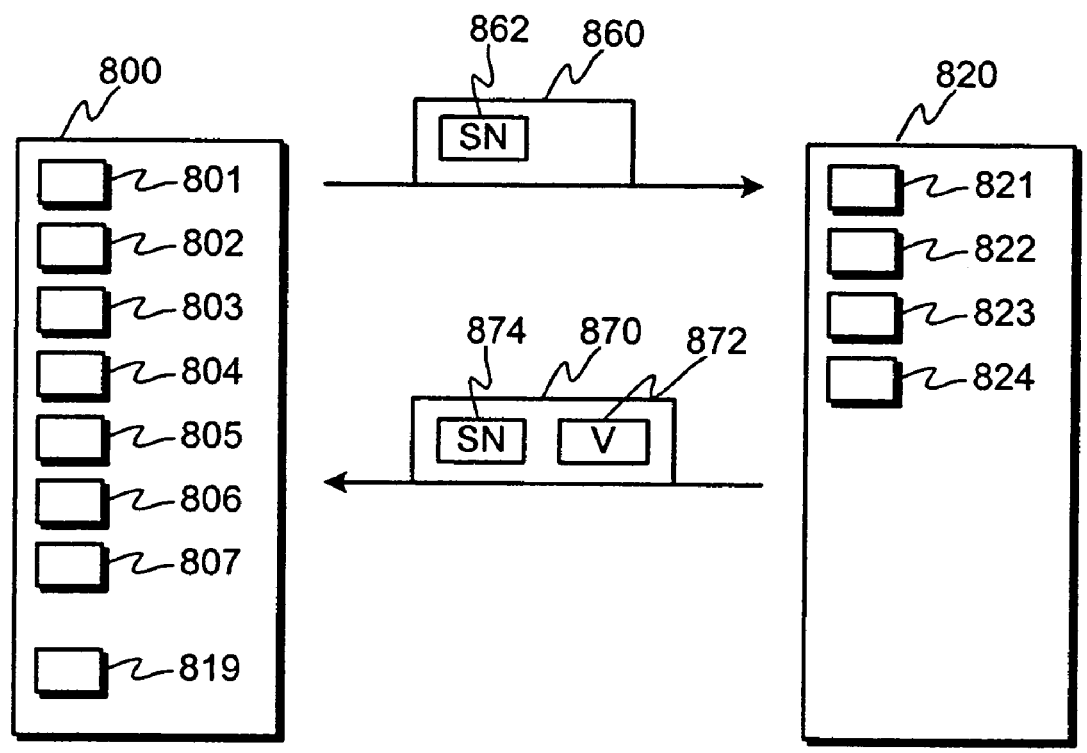
FIG. 8 illustrates a further aspect of the invention.

According to a further aspect of the invention, a source network node 800 for communicating with the IPSec protocol with a destination 820 network node via a communication link is provided. This aspect of the invention is illustrated in FIG. 8. According to an advantageous embodiment of the invention the network node comprises at least means 801 for receiving acknowledgement packets 870 for IPSec packets 860 transmitted by the network node, means 802 for obtaining a sequence number 874 of an IPSec packet from a received acknowledgement packet 870, means 803 for obtaining a value 872 from the acknowledgement packet 870, said value corresponding to the amount of data received via the communication link by the second network node, and means 804 for determining the packet success rate of the communication link at least partly on the basis of said value.

Such a network node can advantageously be used as a source node of an IPSec connection.

According to a further advantageous embodiment of the invention, the network node further comprises at least means 805 for determining the throughput of the communication link at least partly on the basis of said value 872.

According to a further advantageous embodiment of the invention, the network node further comprises at least means 806 for storing in a memory means 819 the sequence number and the transmission time of each IPSec packet transmitted by the network node via the communication link, and means 807 for determining the round trip time of the communication link on the basis of the reception time of an acknowledgement packet and the stored transmission time of the corresponding transmitted packet.

H. A Fifth Group of Further Advantageous Embodiments of the Invention

According to a further aspect of the invention, a destination network node 820 for communicating with the IPSec protocol with a source network node 800 via a communication link is provided. This aspect of the invention is illustrated in FIG. 8. According to an advantageous embodiment of the invention, the network node 820 comprises at least means 821 for transmission of an acknowledgement packet if at least one of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet.

Such a network node can advantageously be used as a destination node of an IPSec connection.

According to a further advantageous embodiment of the invention, the network node comprises at least means 822 for including a sequence number 862, 874 of a received IPSec packet 860 and at least one value corresponding to the amount of data received via the communication link in said acknowledgement packet 870.

According to a further advantageous embodiment of the invention, the network node comprises at least means 823 for including a packet counter value 872 in said acknowledgement packet 870, said packet counter value indicating the number of packets received via the communication link.

According to a further advantageous embodiment of the invention, the network node comprises at least means 824 for including a byte counter value 872 in said acknowledgement packet, said byte counter value indicating the number of bytes received via the communication link.

According to a further advantageous embodiment of the invention, a network node comprises the functionality of a source network node 800 and a destination network node 820 of IPSec connections. According to such an embodiment, the network node comprises at least means 821 for transmission of an acknowledgement packet if at least one of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet, means 801 for receiving acknowledgement packets 870 for IPSec packets 860 transmitted by the network node, means 802 for obtaining a sequence number 874 of an IPSec packet from a received acknowledgement packet 870, means 803 for obtaining a value 872 from the acknowledgement packet 870, said value corresponding to the amount of data received via the communication link by the second network node, and means 804 for determining the packet success rate of the communication link at least partly on the basis of said value.

Means 801 to 807 and 821 to 824 can advantageously be implemented using software program code means executed by a processor unit.

According to a still further aspect of the invention, a software program product for a network node for communicating with the IPSec protocol with a second network node via a communication link is provided. Such a software program product can be used for implementing network nodes able to communicate using the IPSec protocol. According to an advantageous embodiment of the invention, the software program product comprises at least

- software program code means for transmission of an acknowledgement packet if at least one of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet,
- software program code means for receiving acknowledgement packets for IPSec packets transmitted by the network node,
- software program code means for obtaining a sequence number of an IPSec packet from a received acknowledgement packet,
- software program code means for obtaining a value from the acknowledgement packet, said value corresponding to the amount of data received via the communication link by the second network node, and
- software program code means for determining the packet success rate of the communication link at least partly on the basis of said value.

The software program product can be realized in many different ways, such as for example a software routine library for inclusion in other products or as a stand-alone application ready for use in a network node, and represented within many different types of media, such as magnetic, optical or magneto-optical mass memory means such as CD-ROMs, in electronic memory means such as semiconductor memory chips.

I. A Seventh Group of Further Advantageous Embodiments of the Invention

According to a further aspect of the invention, method for selection of a route for transmission of data packets from a source network site to a destination network site is provided. According to a further advantageous embodiment of the invention, the method comprises at least steps of

- selecting of a first internet service provider connection from a set of internet service provider connections connecting the source network site to the internet,
- selecting of a second internet service provider connection from a set of internet service provider connections connecting the destination network site to the internet, in which method said selections are performed at the source network site, and which selections are made at least in part on the basis of at least
- a round trip time value for each combination of source and destination internet service provider connections, and
- a packet success rate for each combination of source and destination internet service provider connections.
- a throughput value for each combination of source and destination internet service provider connections.

The round trip time value can be a last measured round trip time value, or for example if no measurement for a particular combination has been performed or the measurement is older than a specified limit, a default value. The throughput value can be a last measured throughput value, or for example if no measurement for a particular combination has been performed or the measurement is older than a specified limit, a default value.

According to a further advantageous embodiment of the invention, said selections are performed at least in part also on the time elapsed after the selection of routes was previously changed.

According to a further advantageous embodiment of the invention, the amount change in the packet success rate, throughput and/or round trip time of a connection required to cause a change in the route selection reduces as a function of time.

According to a further advantageous embodiment of the invention, said function of time is a piecewise linear function.

According to a further aspect of the invention, a network node for transmitting data packets from from a source network site to a destination network site is provided. According to a further advantageous embodiment of the invention, the network node comprises at least

- means for selecting of a first internet service provider connection from a set of internet service provider connections connecting the source network site to the internet, and
- means for selecting of a second internet service provider connection from a set of internet service provider connections connecting the destination network site to the internet, which selections being made at least in part on the basis of at least

- a round trip time value for each combination of source and destination internet service provider connections, and
- a throughput value for each combination of source and destination internet service provider connections.

According to a further aspect of the invention, a computer software product for a system for transmitting data packets from from a source network site to a destination network site is provided. According to a further advantageous embodiment of the invention, the computer software product comprises at least

- means for selecting of a first internet service provider connection from a set of internet service provider connections connecting the source network site to the internet, and
- means for selecting of a second internet service provider connection from a set of internet service provider connections connecting the destination network site to the internet, which selections being made at least in part on the basis of at least

- a round trip time value for each combination of source and destination internet service provider connections, and
- a packet success rate value for each combination of source and destination internet service provider connections.

J. Further Considerations

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. Method for monitoring of a communication link between a source network node and a destination network node, comprising
employing, on said communication link, the IPSec protocol for tunneling IP packets between the source network node and the destination network node,
transmitting an acknowledgement packet by the destination network node at least when a second condition of a first condition and a second condition is fulfilled, said first condition being the reception of at least a predetermined number of IPSec packets after transmission of the previous acknowledgement packet, and said second condition being the reception of an IPSec packet via the communication link after a predetermined time has passed after transmission of the previous acknowledgement packet.

2. Method for monitoring of a communication link between a source network node and a destination network node, comprising
employing, on said communication link, the IPSec protocol for tunneling IP packets between the source network node and the destination network node,
transmitting an acknowledgement packet by the destination network node at least when a second condition of a first condition and a second condition is fulfilled, wherein said acknowledgement packet comprises at least the sequence number of the last received IPSec packet and at least one value corresponding to the amount of data received via the IPSec communication link, said first condition being the reception of at least a predetermined number of IPSec packets after transmission of the previous acknowledgement packet, and said second condition being the reception of a packet via the communication link after a predetermined time has passed after transmission of the previous acknowledgement packet.

3. A method according to claim 2, wherein said acknowledgement packet comprises at least a packet counter value indicating the number of packets received via the communication link.

4. A method according to claim 2, wherein said acknowledgement packet comprises at least a byte counter value indicating the number of bytes received via the communication link.

5. A method according to claim 2, wherein said acknowledgement packet comprises at least a packet counter value indicating the number of packets received via the communication link and a byte counter value indicating the number of bytes received via the communication link.

6. A method according to claim 2, further comprising at least the step of determining the packet success rate of the communication link at least partly on the basis of information contained in an acknowledgement packet.

7. A method according to claim 2, further comprising at least the step of determining the throughput of the communication link at least partly on the basis of information contained in an acknowledgement packet.

8. A method for measuring the performance of an IPSEC of a communication link between a source network node and a destination network node, comprising
employing, on said communication link, the IPSec protocol for tunneling IP packets between the source network node and the destination network node,
transmitting an acknowledgement packet by the destination network node at least when a second condition of a first condition and a second condition is fulfilled, said first condition being the reception of at least a predetermined number of IPSec packets after transmission of the previous acknowledgement packet, and
said second condition being the reception of an IPSec packet via the communication link after a predetermined time has passed after transmission of the previous acknowledgement packet
storing of the sequence number and the transmission time of each IPSec packet transmitted from the source network node to the destination network node in a memory means, and
determining the round trip time of the communication link on the basis of the reception time of an acknowledgement packet and the stored transmission time of the corresponding transmitted packet.

9. Method for monitoring of a plurality of communication links between a source network site and a destination network site, each of the sites having at least one network node,
in which method an active communication link is monitored and an inactive communication link is monitored,
said method comprising at least the following steps for monitoring an active communication link between the source network site and the destination network site, the active communication link employing the IPSec protocol:
the step of transmission of an acknowledgement packet by the destination network node at least when a second condition of a first condition and a second condition is fulfilled,
said first condition being the reception of at least a predetermined number of IPSec packets after transmission of the previous acknowledgement packet, and
said second condition being the reception of a packet via the communication link after a predetermined time has passed after transmission of the previous acknowledgement packet,
and said method comprising at least the following steps for monitoring an inactive communication link between the source network site and the destination network site:
transmitting a probe packet from a source node at the source network site via said inactive communication link to a destination node at the destination network site,
storing the transmission time of said probe packet in a memory means,
transmitting a response packet from said destination node to said source node as a response to receiving a probe packet,
determining the round trip time of said inactive communication link from the difference of the reception time of the response packet and the stored transmission time of the corresponding probe packet
maintaining present status of said active and inactive communications links or replacing said active communication link with said inactive communication link based on results of said monitoring.

10. A method according to claim 9, said method further comprising the steps of
transmitting a plurality of probe packets from said source node at the source network site via said inactive communication link to said destination node at the destination network site,
receiving response packets to said probe packets, and determining the packet success rate of said inactive communication link from the number of said received response packets and the number of transmitted probe packets.

11. A network node comprising at least means for communicating over a IPSec protocol communication link with a second network node in order to tunnel IP packets transmitted to said second network node, means for sending IPSec packets containing IP packets, means for receiving acknowledgement packets for said IPSec packets, means for obtaining a sequence number of an IPSec packet from a received acknowledgement packet, means for obtaining a value from the acknowledgement packet, said value corresponding to the amount of data received via the communication link by the second network node, and means for determining the packet success rate of the communication link at least partly on the basis of said value.

12. A network node according to claim 11, further comprising at least means determining the throughput of the communication link at least partly on the basis of said value.

13. A network node comprising at least means for communicating over a IPSec protocol communication link with a second network node in order to tunnel IP packets transmitted to said second network node, means for sending IPSec packets containing IP packets, means for receiving acknowledgement packets for said IPSec packets, means for obtaining a sequence number of an IPSec packet from a received acknowledgement packet, means for storing in a memory means the sequence number and the transmission time of each IPSec packet transmitted by the network node via the communication link, and means for determining the round trip time of the communication link on the basis of the reception time of an acknowledgement packet and the stored transmission time of the corresponding transmitted packet.

14. A network node comprising at least means for communicating over a IPSec protocol communication link with a second network node in order to tunnel IP packets transmitted from said second network node, means for sending IPSec packets containing IP packets, means for transmitting an acknowledgement packet at least when a second condition of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet.

15. A network node comprising at least means for communicating over a IPSec protocol communication link with a second network node in order to tunnel IP packets transmitted from said second network node, means for receiving IPSec packets containing IP packets, means for transmitting an acknowledgement packet at least when a second condition of a first condition and a second condition is fulfilled, means for inserting a sequence number of a received IPSec packet and at least one value corresponding to the amount of data received via the communication link in said acknowledgement packet, said first condition being the reception of at least a predetermined number of IPSec packets after transmission of the previous acknowledgement packet, and said second condition being the reception of a packet via the communication link after a predetermined time has passed after transmission of the previous acknowledgement packet.

16. A network node according to claim 15, said network node further comprising at least means inserting a packet counter value in said acknowledgement packet, said packet counter value indicating the number of packets received via the communication link.

17. A network node according to claim 15, said network node further comprising at least means inserting a byte counter value in said acknowledgement packet, said byte counter value indicating the number of bytes received via the communication link.

18. A network node comprising at least means for communicating over a IPSec protocol communication link with a second network node in order to tunnel IP packets transmitted from said second network node, means for transmitting an acknowledgement packet at least when a second condition of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet, means for sending IPSec packets, means for receiving acknowledgement packets for said IPSec packets, means for obtaining a sequence number of an IPSec packet from a received acknowledgement packet, means for obtaining a value from the acknowledgement packet, said value corresponding to the amount of data received via the communication link by the second network node, and means for determining the packet success rate of the communication link at least partly on the basis of said value.

19. Software program product comprising a computer readable medium containing computer-readable software program code for a network node for controlling said network node to communicate using the IPSec protocol with a second network node via a communication link, said software program code comprising at least software program code for communicating over a IPSec protocol communication link with a second network node in order to tunnel IP packets transmitted from said second network node, software program code for receiving IPSec packets containing IP packets, software program code for transmitting an acknowledgement packet at least when a second condition of a first condition and a second condition is fulfilled, said first condition being the reception of at least a predetermined number of IPSec packets after transmission of the previous acknowledgement packet, and said second condition being the reception of a packet via the communication link after a predetermined time has passed after transmission of the previous acknowledgement packet, software program code for receiving acknowledgement packets for IPSec packets transmitted by the network node, software program code for obtaining a sequence number of an IPSec packet from a received acknowledgement packet, software program code for obtaining a value from the acknowledgement packet, said value corresponding to the amount of data received via the communication link by the second network node, and software program code for determining the packet success rate of the communication link at least partly on the basis of said value.

20. Software program product comprising a computer readable medium containing computer-readable software program code for a network node for controlling said network node to communicate using the IPSec protocol with a second network node via a communication link, said software program code comprising at least software program code for communicating over a IPSec protocol communication link with a second network node in order to tunnel IP packets transmitted to said second network node, software program code for sending IPSec packets containing IP packets, software program code for receiving acknowledgement packets for said IPSec packets, software program code for obtaining a sequence number of an IPSec packet from a received acknowledgement packet, software program code for storing in a memory means the sequence number and the transmission time of each IPSec packet transmitted by the network node via the communication link, and software program code for determining the round trip time of the communication link on the basis of the reception time of an acknowledgement packet and the stored transmission time of the corresponding transmitted packet.

21. Method for monitoring of a communication link between a source network node and a destination network node, comprising employing, on said communication link, the IPSec protocol for tunneling IP packets of one or more TCP/IP connections between the source network node and the destination network node, transmitting, separately from TCP retransmission scheme carried out on said one or more TCP/IP connections, an acknowledgement packet by the destination network node if at least one of a first condition and a second condition is fulfilled, said first condition being the reception of at least a predetermined number of IPSec packets after transmission of the previous acknowledgement packet, and said second condition being the reception of an IPSec packet via the communication link after a predetermined time has passed after transmission of the previous acknowledgement packet.

22. A method according to claim 21, comprising tunneling IP packets of two or more TCP/IP connections by means of said communication link using the IPSec protocol.

* * * * *